M. TAYLOR.
LUBRICATOR.
APPLICATION FILED OCT. 12, 1911.
1,032,570.
Patented July 16, 1912.
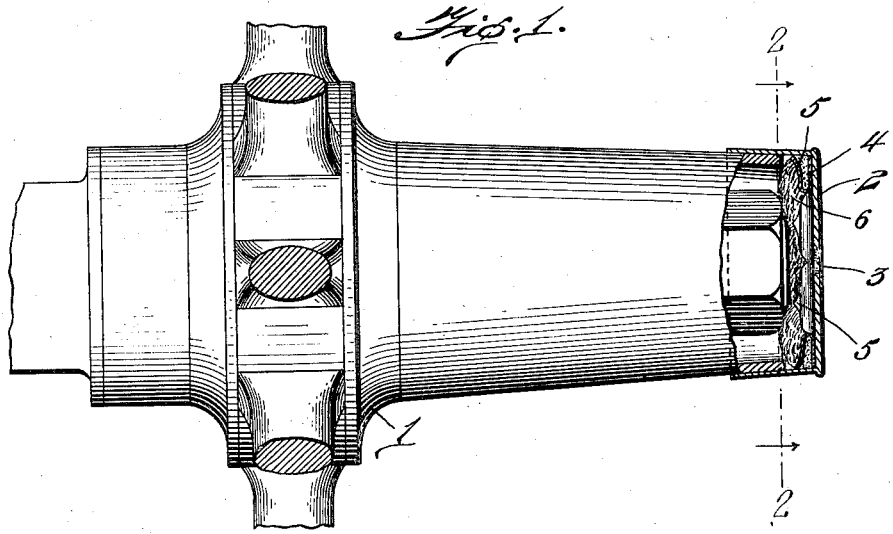
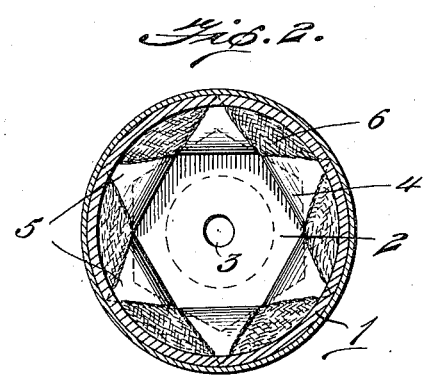
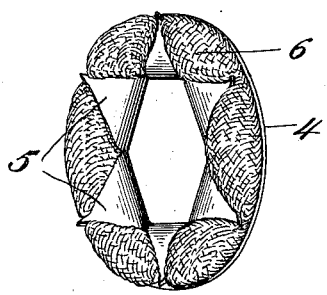
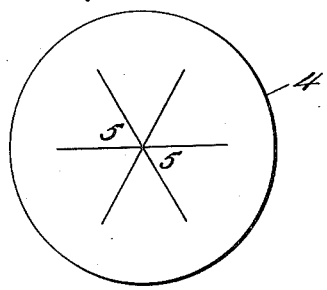
Inventor
Marion Taylor
Witnesses
by Attorneys

UNITED STATES PATENT OFFICE.

MARION TAYLOR, OF SOUDAN, VIRGINIA.

LUBRICATOR.

1,032,570.

Specification of Letters Patent. Patented July 16, 1912.

Application filed October 12, 1911. Serial No. 654,426.

*To all whom it may concern:*

Be it known that I, MARION TAYLOR, a citizen of the United States, residing at Soudan, in the county of Mecklenburg and State of Virginia, have invented certain new and useful Improvements in Lubricators; and I do declare the following to be a full, clear, and exact description of the invention, such as will enable others skilled in the art to which it appertains to make and use the same.

This invention relates to an improved lubricator especially adapted for vehicle axles.

The object of the invention is to provide a simple and efficient device which may be easily applied to any wheel hub already in use and which remains in position thereon and supplies oil to the axle as needed without any waste, the oil being conveyed to the spindle or axle as the wheel revolves.

With this and other objects in view, the invention consists of certain novel features of construction, combination and arrangement of parts as will be more fully described and particularly pointed out in the appended claims.

In the accompanying drawings:—Figure 1 represents a side elevation partly in section of a wheel hub and axle end with this improved lubricator applied. Fig. 2 is a vertical section taken on line 2—2 of Fig. 1, the nuts on the axle being shown in dotted lines to indicate the manner in which it wipes over the lubricator to extract the oil. Fig. 3 is a perspective view of the oil retaining member detached; and Fig. 4 is a plan view of the blank from which the packing holder is formed.

In the embodiment illustrated, a wheel hub 1 of ordinary construction is shown in position on the end of a vehicle axle and applied to the outer end thereof is this improved lubricator which consists of a cap 2 of any suitable metal having an aperture 3 in the closed end thereof through which oil may be inserted by means of an oil can or otherwise. Removably arranged within this cap 2 is an oiling member 4, preferably composed of a metal disk slit radially from its center toward its periphery to form tongues, as 5, which are substantially triangular in shape and are bent backward upon the disk to form clamping means for a fibrous packing 6 which is held between these tongues and the adjacent face of the disk thereby producing an annular oiling member. This oiling member is removably arranged within the cap being of a size sufficient to fit closely within the cap and be held in operative position therein by friction. The packing 6 is preferably composed of wool, but may be of any other suitable substance designed to absorb the oil poured in through the aperture 3 and feed it to the axle spindle, the oil being conveyed to said spindle on the revolution of the wheel, by the nut on the axle engaging the packing 6 and forcing the oil out.

This lubricator avoids the necessity of removing the taps and the wheels and the cap 2 is preferably applied by driving it on the end of the hub thereby rendering it easily adjusted to any wheel without any change being made in the hub.

While this lubricator has been described as applied to a vehicle axle, it will be evident that it may be secured to the end of any shaft where a lubricator may be needed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claims.

I claim as my invention:—

1. An axle lubricator comprising a cap having an oil aperture therein, an annular member in said cap provided with a plurality of clamping tongues, and fibrous material secured between the tongues and the adjacent face of the annular member.

2. An axle lubricator comprising a cap having an oil aperture therein, an oiling member mounted in said cap and composed of an annular metal member having a plurality of triangular tongues extending from the inner edge thereof toward its periphery, and a fibrous material arranged between said tongues and the adjacent face of said annular member.

3. An axle lubricator comprising a cap having an oiling aperture therein, an oiling member mounted in said cap and composed of a metal disk slit radially from its center toward its periphery to form triangular tongues, said tongues being bent backward upon the disk to form clamping elements, and a fibrous material arranged on said disk between said tongues and the adjacent face of the disk.

In testimony whereof I have hereunto set my hand in presence of two subscribing witnesses.

MARION TAYLOR.

Witnesses:
C. S. WOODS,
JAS. P. TAYLOR.